(12) United States Patent
Flemming et al.

(10) Patent No.: US 8,219,995 B2
(45) Date of Patent: Jul. 10, 2012

(54) CAPTURING HARDWARE STATISTICS FOR PARTITIONS TO ENABLE DISPATCHING AND SCHEDULING EFFICIENCY

(75) Inventors: Diane G. Flemming, Pflugerville, TX (US); Octavian F. Herescu, Austin, TX (US); William A. Maron, Austin, TX (US); Mysore S. Srinivas, Austin, TX (US)

(73) Assignee: International Business Machins Corporation, Armonk, NY (US)

( * ) Notice: Subject to any disclaimer, the term of this patent is extended or adjusted under 35 U.S.C. 154(b) by 1412 days.

(21) Appl. No.: 11/692,276

(22) Filed: Mar. 28, 2007

(65) Prior Publication Data
US 2008/0244568 A1 Oct. 2, 2008

(51) Int. Cl.
*G06F 9/46* (2006.01)
(52) U.S. Cl. ........................................ 718/104
(58) Field of Classification Search ............... 718/1, 104
See application file for complete search history.

(56) References Cited

U.S. PATENT DOCUMENTS

| | | | |
|---|---|---|---|
| 3,748,450 A * | 7/1973 | Fico et al. | 341/88 |
| 2002/0087611 A1* | 7/2002 | Tanaka et al. | 709/1 |
| 2004/0128670 A1* | 7/2004 | Robinson et al. | 718/1 |
| 2005/0132363 A1* | 6/2005 | Tewari et al. | 718/1 |
| 2005/0240933 A1* | 10/2005 | Barsness et al. | 718/105 |
| 2008/0222643 A1* | 9/2008 | Baryshnikov et al. | 718/104 |

OTHER PUBLICATIONS

Fedorova et al.; "Chip Multithreading Systems Need a New Operating System Scheduler"; Harvard University; Sun Microsystems; 5 pages, 2004.

* cited by examiner

*Primary Examiner* — Jennifer To
*Assistant Examiner* — Blake Kumabe
(74) *Attorney, Agent, or Firm* — Yudell Isidore Ng Russell PLLC

(57) ABSTRACT

A method, system and computer program product enables the granular collection and utilization of hardware statistical samples for the efficient scheduling and allocation of data processing resources. In particular, a Partition Statistics Capture and Analysis (PSCA) utility utilizes special purpose registers to collect statistical samples, such as: (1) instructions completed; (2) Level2 (L2) cache misses; (3) cycles per instruction (CPI); and/or (4) other statistics selected based on the programming of the PSCA utility. Further, these statistical samples are utilized for the several purposes, including: (1) determining how long (time) the footprint of a partition takes to become established during the "cold start" period, i.e., during system instantiation; (2) detecting movement of the CPI curve in order to determine the (shifted) location of the onset of steady state (i.e., the knee) on the CPI curve; and (3) utilizing the statistical samples to guide dispatch decisions and make tuning recommendations.

18 Claims, 9 Drawing Sheets

CAPTURING HARDWARE STATISTICS FOR PARTITIONS TO ENABLE DISPATCHING AND SCHEDULING EFFICIENCY

CROSS-REFERENCE TO RELATED APPLICATIONS

The present application is related to the following U.S. patent applications:

U.S. patent application Ser. No. 11/692,338, titled "Workload Management In Virtualized Data Processing Environment"; U.S. patent application Ser. No. 11/692,346, titled "Workload Management In Virtualized Data Processing Environment"; and U.S. patent application Ser. No. 11/692,537, titled "Workload Management In Virtualized Data Processing Environment" all filed concurrently herewith. The above-mentioned patent applications are assigned to the assignee of the present invention and are incorporated herein by reference.

BACKGROUND OF THE INVENTION

1. Technical Field

The present invention generally relates to data processing systems and in particular to the efficient allocation of data processing system resources to partitions.

2. Description of the Related Art

Virtualization and Micro-Partitioning are technologies that increase system performance and enhance efficiency in data processing systems. Micro-Partitioning is the technology which allows for multiple partitions to share one physical processor. A partition may be defined as an allocation of data processing resources within a time limited dispatch window. After a partition is activated, processing capacity is usually referred to as capacity entitlement or entitled capacity. The shared processor partitions are dispatched (into a dispatch window) and time-sliced on the physical processors that are under control of the Power Hypervisor (Phyp), a component of firmware. The Hypervisor schedules shared processor partitions from a set of physical processors that is called the shared processor pool.

In virtualization, physical processors are abstracted into virtual processors that are then assigned to partitions. The underlying physical processors are shared by these partitions, which may be "capped or uncapped" partitions. In a virtualized environment, a partition is guaranteed full use of its entitlement within the dispatch window. For example, in International Business Machines' (IBM's) POWER5™ processor, the AIX dispatch window has a ten (10) millisecond (ms) duration. Capped processing does not allow a partition to utilize unused processing capacity in other partitions. With uncapped processing, after a partition reaches the allotted processing capability, the partition is allowed to utilize unused capacity in other partitions. Any unused portion of the dispatch window is redistributed to the "uncapped partitions" in the system. Thus, the uncapped partition may provide better overall utilization of the total system and the system's partitions. A lottery mechanism based on the uncapped partitions' weight is employed to determine which uncapped partition will be dispatched.

A problem may occur if a partition has consumed all of its time in the current dispatch window and requires additional time to complete a transaction before the end of the current dispatch window. However, since this partition is generally not the next partition to be dispatched, the uncompleted transaction must wait until the next dispatched window in order to be completed. The footprint of the next scheduled partition must be established when this next partition is dispatched, and there is no guarantee that the next scheduled partition does not disturb the footprint of the original partition. Consequently, the ability of the next partition to quickly establish a footprint and carry out meaningful work in a specific allocation of time, without disturbing the footprint of the original partition, remains uncertain.

The footprint of a partition refers to the partition's allocation of resources, which resources include memory, processor, and Input/Output (I/O). Generally, footprint costs are associated with repopulating processor state (registers) and memory (caches, main memory); However, I/O is a factor as well in the determination of footprint costs. Determining the cost of loading a partition's footprint is important because unlike applications running in a dedicated environment, the footprint of a partition must be established each time the partition is dispatched.

Thus, as addressed by the present invention, POWER hypervisor (Phyp) dispatching may be made more efficient if there was information about the time taken to establish a workload footprint each time the partition is dispatched. Collecting statistics about start up costs, for example, may facilitate the Phyp dispatch efficiency. Additionally, the efficient and appropriate utilization of these collected statistics makes the application of partition level tuning possible.

The present invention further recognizes that while it is possible to use software methods to collect partition statistics, the software methods have several disadvantages. For example, in order to achieve the required granularity, e.g., accessing the sub-millisecond level of statistical sampling, the software methods introduce too many interrupts, thereby smudging the behavior of the footprint load.

SUMMARY OF AN EMBODIMENT OF THE INVENTION

Disclosed is a method, system and computer program product for the granular collection and utilization of hardware statistical samples for the efficient scheduling and allocation of data processing resources. In particular, a Partition Statistics Capture and Analysis (PSCA) utility utilizes a number of special purpose registers called processor utilization resource registers (PURR) to collect the statistical samples for the accounting of partition processes. Among the statistical samples provided by the PSCA utility are one or more of the following: (1) instructions completed; (2) Level2 (L2) cache misses; (3) cycles per instruction (CPI), and/or (4) other statistics, which are selected based on the programming of the PSCA utility. Further, the PSCA utility provides these statistics for several purposes, including: (1) determining how long (time) the footprint of a partition takes to become established during the "cold start" period, i.e., during system instantiation; (2) detecting movement of the cycles per instruction (CPI) curve in order to determine the (shifted) location of the onset of steady state (i.e., the knee) on the CPI curve; and (3) utilizing the statistical samples to guide dispatch decisions and make tuning recommendations.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system and computer program product for the granular collection and utilization of hardware statistical samples for the efficient scheduling and allocation of data processing resources. In particular, a Partition Statistics Capture and Analysis utility (PSCA) utilizes a number of special purpose registers called processor utilization resource registers (PURR) to collect the statistical samples for the accounting of partition processes. The statistical samples provided by the PSCA utility include one or more of the following, as examples: (1) instructions completed; (2) Level2 (L2) cache misses; and (3) cycles per instruction (CPI). Other statistics may be sampled, and are selected based on the programming of the PSCA utility. Thus, while specific statistics are utilized in the description of the various embodiments, it is understood that other statistics are available, and that the statistics provided here are simply examples provided for the purposes of demonstrating the invention.

According to the described embodiments, the PSCA utility provides these statistics for several purposes, including, but not limited to: (1) determining how long (time) the footprint of a partition takes to become established during the "cold start" period, i.e., during system instantiation; (2) detecting movement of the cycles per instruction (CPI) curve in order to determine the (shifted) location of the onset of steady state (i.e., the knee) on the CPI curve; and (3) utilizing the statistical samples to guide dispatch decisions and make tuning recommendations.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is also understood that the use of specific parameter names are for example only and not meant to imply any limitations on the invention. The invention may thus be implemented with different nomenclature/terminology utilized to describe the various parameters, without limitation.

Figure 1:
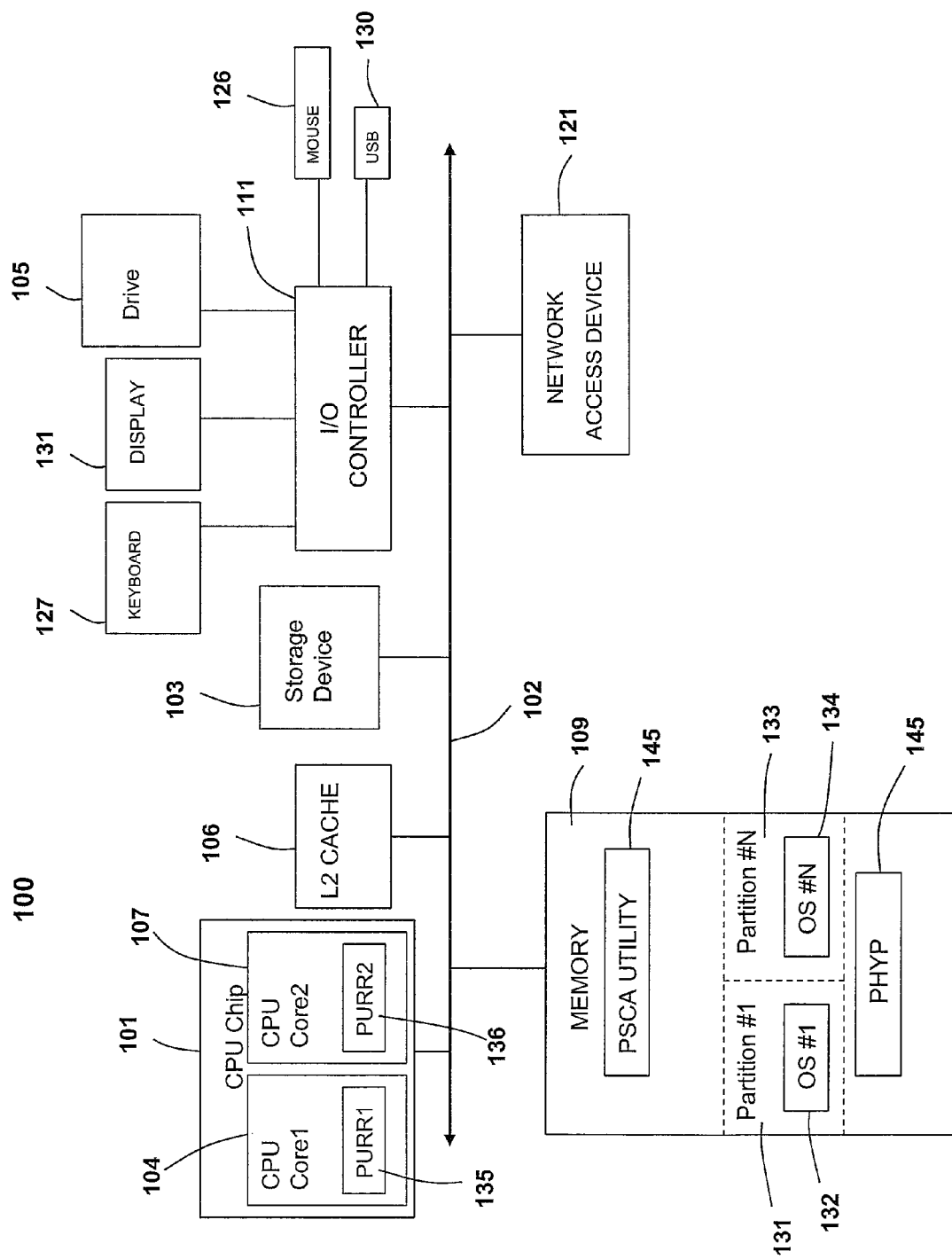
FIG. 1 is a block diagram illustrating a data processing system, having therein a Partition Statistics Collection and Analysis (PSCA) utility, in accordance with one embodiment of the invention.

With reference now to the figures, FIG. 1 depicts a block diagram representation of a data processing system within which features of the invention may be advantageously implemented. Data processing system (DPS) 100 comprises processor die (or chip) 101 coupled to a memory 130 via a system bus/interconnect 110. Processor die 101 comprises CPU Core1 (CPU1) 102 and CPU (CPU2) Core2 103.

In DPS 100, Processor die 101 is a dual core processor (e.g., IBM's Power5 processor) comprising CPU Core1 102 and CPU Core2 103, which may include simultaneous multithreading (SMT) technology. Further, CPU Core1 102 comprises first Processor Utilization Resource Register (PURR1) 104 and CPU Core2 103 comprises second Processor Utilization Resource Register (PURR2) 135. Processor die 101, with the dual-core design comprising CPU1 102 and CPU2 103, each supporting simultaneous multithreading (two or more hardware threads per core), appears as a four-way microprocessor system to the operating system. Processor die 101 is hereinafter referred to (interchangeably) as a Power5 processor.

Affiliated with processor CPU1 102 and CPU2 103 is lower level (L2) cache 106. Also, in addition to the processors on processor die 101, DPS 100 also comprises service processor 145, which is responsible for supporting the implementation of partitioning of resources of DPS 100 by Phyp 145, as described in greater detail below.

Also coupled to system bus 110 is an input/output controller (I/O Controller) 120, which controls access by several input devices, of which mouse 121 and keyboard 122 are illustrated. I/O Controller 120 also controls access to output devices, of which display 123 is illustrated. In order to support use of removable storage media, I/O Controller 120 may further support one or more USB ports, for example, USB 124, and (media) drive 125, which may be any one of compact disk Read/Write (CDRW), digital video disk (DVD), or other media drive. Storage device 126, which may provide persistent and/or permanent storage, may be accessed through and controlled by I/O controller 120, although access to storage device 126 may be through different access mechanisms other than I/O controller 120, depending on the specific configuration of data processing system 100.

DPS 100 further comprises network access device (NAD) 128 by which DPS 100 is able to connect to and communicate with an external device or network (such as the Internet). NAD 128 may be a modem or network adapter or a wireless transceiver device, for example.

Those of ordinary skill in the art will appreciate that the hardware depicted in FIG. 1 may vary. Other peripheral devices may also be used in addition to or in place of the hardware depicted. Thus, the depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Various features of the invention are provided as software or firmware code stored within memory 130 or other storage (e.g., storage device 126) and executed by processors CPU1 102 and/or CPU2 103 (or service processor 137). Among the software/firmware code are code for enabling the pooling of system resources and for supporting processor partitioning and dynamic resource movement across multiple operating system environments (e.g. POWER Hypervisor code), and more specific to the invention, code for enabling the granular statistical sampling and data analysis features described below. For simplicity, the collective body of code that enables the statistical sampling and data analysis features is referred to herein as the partition statistics collection and analysis (PSCA) utility. In actual implementation, the PSCA utility may be added to existing firmware code and operating system (OS) code to provide the PSCA utility functionality described below.

Thus, as shown by FIG. 1, in addition to the above described hardware components, data processing system 100 farther comprises first operating system (OS1) 132 and second operating system (OS2) 134. Examples of these operating systems include Microsoft Windows(g, a trademark of Microsoft Corp, or GNU®/Linux®, registered trademarks of the Free Software Foundation and The Linux Mark Institute. DPS 100 also comprises Power Hypervisor (Phyp) 135, one or more software applications 137, and PSCA utility 140. In one embodiment, OS1 132, OS2 134 and PSCA utility 140 are located within memory 130 (or storage device 126) in persistent fashion and are executed on processors of processor die 101. According to the illustrative embodiment, when CPU1 102 and CPU2 103 execute instructions from PSCA utility 140, PSCA utility 140 enables data processing system 100 to complete a series of functional processes, including: (1) monitoring of partition data; (2) performing granular statistical sampling; (3) performing statistical analyses to facilitate tuning recommendations and dispatch decisions; and other features/functionality described below and illustrated by FIGS. 3-10. In one embodiment, portions of the functionality provided by PSCA utility 140 are provided as an extension of Phyp processing by service processor 145.

A hardware facility in the POWER5 design called the POWER Hypervisor Decrementer (HDEC) 137 is programmed to provide Phyp 135 with a timed interrupt independent of partition activity. These timed interrupts are routed directly to Phyp 135, and use only Phyp 135 resources to capture state information from the partition. HDEC 137 is a physical register controlled by firmware, namely Phyp 135. HDEC 137 is used for fine-grained dispatching of multiple partitions on shared processors. While shown as directly associated with Phyp 135 within memory 130, it is understood that the actual location of HDEC 137 may vary depending on the specific configuration of DPS 100 implemented, and the presentation of HDEC 137 herein is solely to illustrate that HDEC 137 is a functional component associated with Phyp 135.

According to the described embodiments, CPU1 102 and CPU2 103 may include simultaneous multithreading (SMT) technology. Simultaneous multithreading is a hardware multithreading technology that greatly improves the utilization of the processor's hardware resources, resulting in a better system performance. Superscalar processors are capable of issuing multiple instructions in a single cycle from a single code path (hardware thread), but processors using simultaneous multithreading may issue multiple instructions from multiple code paths (hardware threads) in a single cycle. Hence, multiple instructions from multiple hardware threads may be issued in a single processor cycle of (processors on) processor die 101.

The purpose of simultaneous multithreading is to increase the number of instructions that may be executed in a unit of time through the microprocessor. Each thread uses microprocessor resources such as registers to execute instructions. Under almost all circumstances, there are sufficient resources to have more throughput with two threads executing than with a single thread executing. However, the simultaneous execution of two threads results in the sharing of microprocessor resources.

Virtualization is the pooling of system resources to access processors, memory, and I/O devices across logical partitions. Logical partitioning of a system allows more than one operating system to reside on the same platform simultaneously without interfering with each other. There are two types of partitions in the IBM Sserver p5 systems, which can coexist in the same system at any given time: (1) dedicated processor partitions; and (2) shared processor partitions or micro-partitions.

The described embodiments enhance Micro-Partitioning technology utilizing the given configuration of hardware devices (i.e., system resources) and associated software/firmware components and functional utilities. Micro-Partitioning technology allows for multiple partitions to share one physical processor of which CPU1 102 (in DPS 100) is an example. Partitions using Micro-Partitioning technology are referred to as shared processor partitions.

In DPS 100, memory 130 comprises N logical partitions, consisting of logical partition #1 131 through logical partition #N 133. Each logical partition includes a corresponding operating system. In particular, logical partition #1 131 includes OS #1 132 and logical partition #N 133 includes OS #N 134. The operating system in each partition may be the same as the operating systems in other partitions, or may be a completely different operating system. Thus, one partition may run the OS/400 operating system, while a different partition may run another instance of OS/400, possibly a different release. The operating systems in the logical partitions may even be different than OS/400 (e.g., operating systems such as AIX or Linux), provided that the operating system is compatible with the hardware. Thus, the operating systems may provide completely different computing environments on the same physical computer system (DPS 100).

Figure 2:
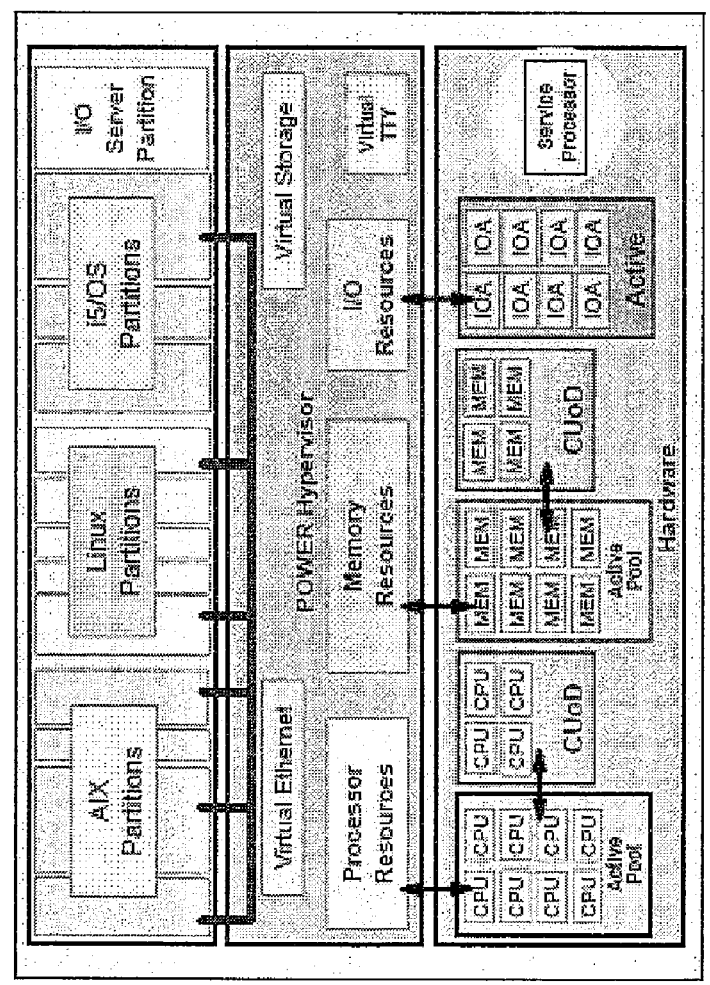
FIG. 2 illustrates a virtualization engine system, including a Power hypervisor (Phyp), as implemented on a Power5 processor system, according to an illustrative embodiment of the present invention.

In addition to the sharing of a processor, devices may be shared through virtual I/O, virtual terminals, and virtual Ethernet (as shown in FIG. 2, described below). Micro-Partitioning allows less than a full physical processor to be allocated to a logical partition. With POWER5 technology, the smallest granularity of partitioning is the assignment of a fraction of a processor to a partition.

The technology behind the virtualization of the IBM Sserver p5 systems, for example, is provided by a component of firmware known as the POWER Hypervisor (Phyp), for example, Phyp 135. Phyp 135 performs the initialization and configuration of the POWER5 processor, as well as provides the virtualization support required to run multiple partitions (up to 254 partitions on the IBM Sserver p5 servers) concurrently.

Phyp 135 supports a number of functions which includes sharing of processors, virtual I/O, and high-speed communications among partitions. Additionally, Phyp 135 allows multiple operating systems (as shown in FIG. 1) to run on the single system. With support for dynamic resource movement across multiple environments, processors, memory, and I/O may be moved between partitions on the system as workloads are moved between the partitions.

FIG. 2 illustrates the virtualization engine system 200, including Phyp 135 (Power Hypervisor) as implemented on a Power5 processor system, according to an illustrative embodiment of the present invention. Phyp 135 is the underlying control mechanism that resides below operating systems layer 232 but above hardware layer 201. Phyp 135 owns all system resources (e.g., processor resources, memory resources, and I/O resources) and creates partitions (e.g., AIX partitions, Linux partitions, i5/OS partitions, and I/O server partition) by allocating and sharing these resources. Phyp 135 validates that the partition has ownership of the resources the partition is attempting to access, such as processor, memory, and I/O. Phyp 135 then completes the function(s) which allow the partition to access these resources. Phyp 135 further allows for the complete isolation of partition resources.

The POWER5 processor also allows the sharing of processors by multiple partitions. Phyp 135 attempts to maintain physical processor affinity when dispatching virtual processors. As a result, Phyp 135 always tries to first dispatch the virtual processor on the same physical processor on which the virtual processor last ran. Depending on resource utilization, Phyp 135 will broaden the search out to the other processor(s) on the POWER5 chip, then to another chip on the same multi-chip module (MCM).

After a partition is activated, processing capacity is usually referred to as capacity entitlement or entitled capacity. The shared processor partitions are dispatched and time-sliced on the physical processors (of processor die 101) that are under control of Phyp 135. Phyp 135 schedules shared processor partitions from a set of physical processors that is called the shared processor pool. Processing capacity is specified in terms of processing units. Processing units can be configured in fractions of 1/100 of a processor. For example, the capacity of 1/10 of a processor is specified as 0.1 processing units.

Figure 3:
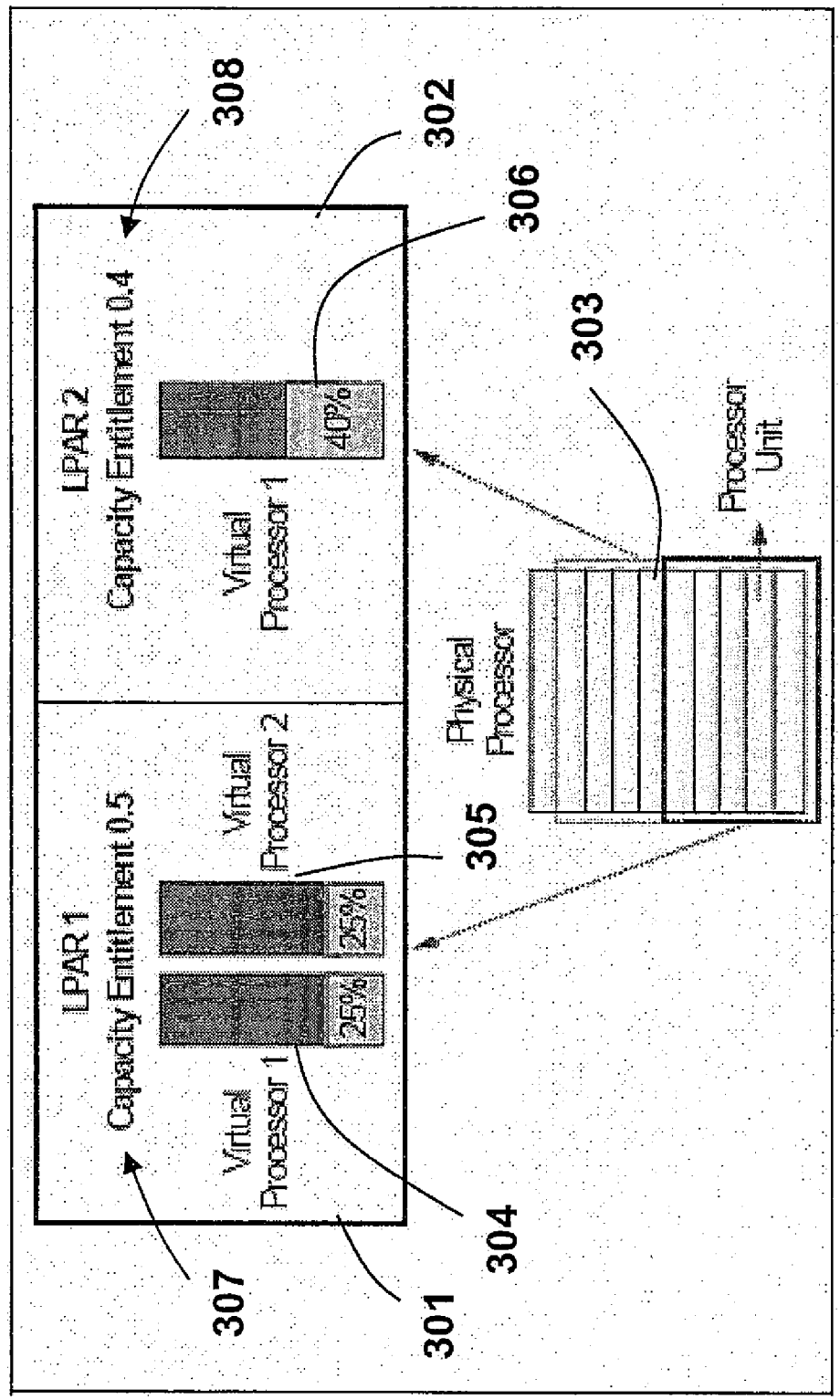
FIG. 3 is an illustration of the distribution of capacity entitlement on virtual processors, according to the described embodiment.

Referring now to FIG. 3, at which distribution of capacity entitlement on virtual processors is illustrated. FIG. 3 comprises physical processor 302, which is shown partitioned into ten (10) individual 0.1 processing units. Specific numbers of the processing units are allocated to two logical partitions, first partition (LPAR1) 331 and second partition (LPAR2) 333. First partition, LPAR1 331 includes two virtual processors, first virtual processor (1) 304 and second virtual processor (2) 305. Second partition, LPAR2 333 includes a single virtual processor (1) 306. In FIG. 3, LPAR1 331 has first capacity entitlement 307 of 0.5 (corresponding to 50% of the total available processor units). LPAR2 333 has second capacity entitlement 308 of 0.4 (corresponding to 40% of the total available processor units). Thus, LPAR1 receives 50% of the total processor units from physical processor 303, while LPAR2 receives 40% of the total processor units from physical processor 303. In LPAR1 331, the entitled/allocated processor units are evenly distributed with first virtual processor (1) 304 and second virtual processor (2) 305 each receiving 25% of the total processor units. In LPAR2 333, the single virtual processor (1) 306 receives 40% of the total processor units.

Each virtual processor is guaranteed to get an entitled share of processor cycles during each 10 millisecond (ms) dispatch window. The entitled capacity, along with a defined number of virtual processors, defines the physical processor resource that will be allotted to the partition. If a partition's allocation of cycles is not used in a scheduling window, the partition will lose the unused cycles. The minimum allocation of resource (time) is 1 ms per processor. Phyp 135 calculates the number of milliseconds (unit time) using the capacity entitlement and the number of virtual processors for each shared pool. An uncapped partition (unlike a capped partition) may get (be allowed) more than the uncapped partition's allocation of cycles in a scheduling window. Virtual processors are time-sliced through the use of the HDEC 137 much like the operating system's time slicing of threads. The HDEC 137 and time base are used by a Phyp dispatcher for virtual processor accounting.

Care must be taken when the micro-partition size is configured, especially if the workload that is running in the partition is CPU intensive and/or has some response time criteria. For example, some CPU intensive workloads require 10-20 milliseconds of CPU processing to complete a transaction. When a workload with similar processing requirements is placed in too small of a micro-partition, the process may experience increases in response time.

Figure 4:
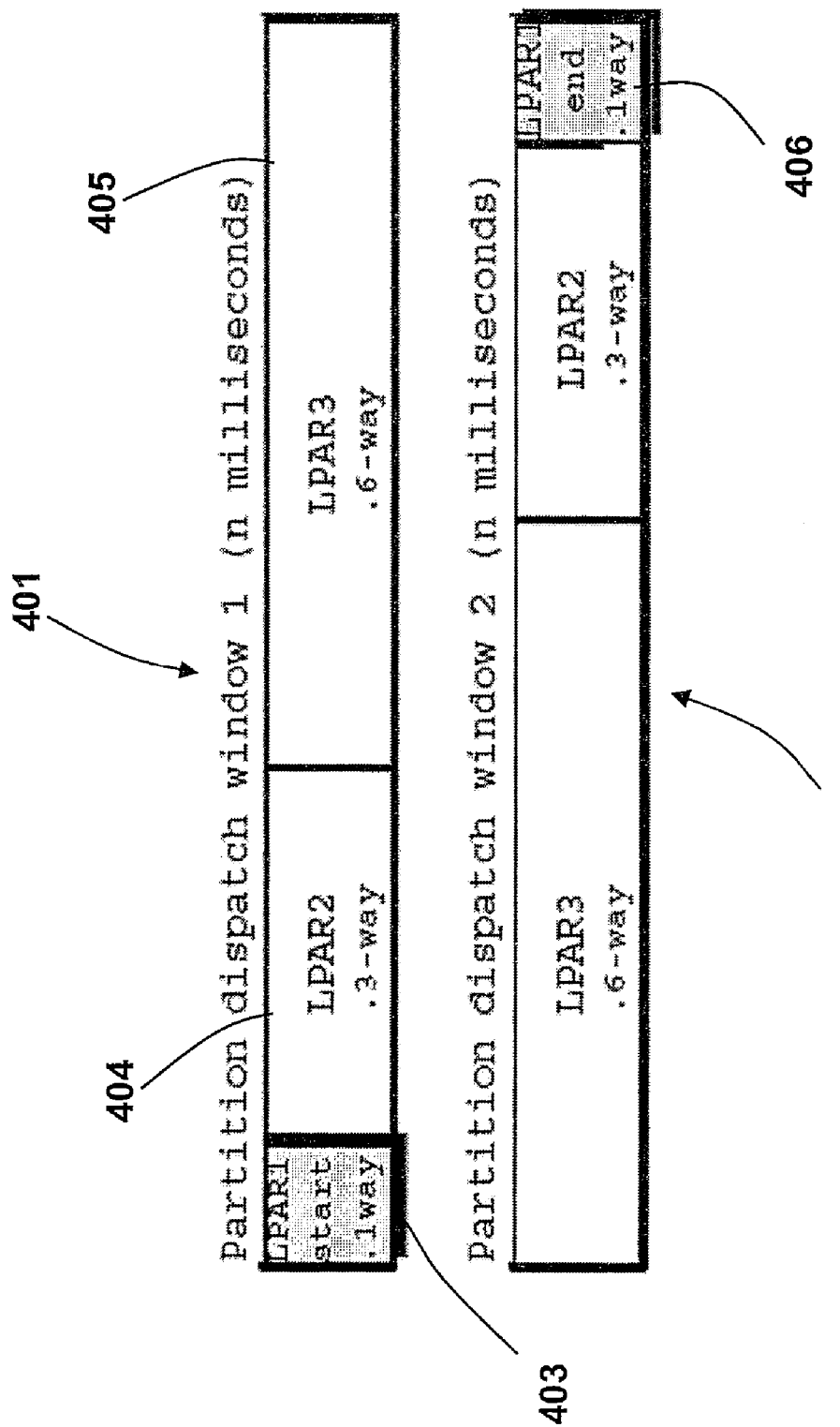
FIG. 4 illustrates an example of two dispatch windows with three (micro) partitions running concurrently, according to the conventional implementation.

FIG. 4 is an example illustrating conventional application of two dispatch windows with three (micro) partitions running concurrently, where the micro-partition size of the LPAR1 is too small. As shown, FIG. 4 comprises first dispatch window 401 and second dispatch window 402, which each have first partition (LPAR1) 403, second partition (LPAR2) 404 and third partition (LPAR3) 405 assigned thereto. In the example of FIG. 4, LPAR1 is allocated 10% of a physical processor (using capped processing) from a shared processor pool (a single processor, in this example). With this implementation, micro-partitions will be given a portion of a processor time-slice directly proportional to the "size" of the partition. Since LPAR1 403 was assigned 10% of a physical processor, LPAR1 403 will get 10% of each available time-slice. Because transactions executing in LPAR1 403 require 20% of a physical processor to be completed, these transactions will not finish until sometime during the second time-slice.

For this example, if first dispatch window 401 was 10 milliseconds, then the portion/time-slice for LPAR1 403 of first dispatch window 401 is 1 millisecond (10%). A transaction executing on LPAR1 403 which requires 2 milliseconds of processing to complete would finish somewhere between an interval of 11 and 20 milliseconds during second dispatch window 402. When compared to the average two (2) milliseconds transaction CPU service time which would occur if LPAR1 403 was better configured as a virtual processor with an entitled capacity of 0.2 processor units, the time interval (for LPAR1 403 transaction completion according to conventional implementation) represents a five (5) to ten (10) times longer CPU service time.

Unlike the above conventional implementation, Phyp 135 manages the distribution of available physical processor cycles to all the processors in the shared pool. Phyp 135 uses a 10 ms dispatch cycle, and each virtual processor is guaranteed to get its entitled share of processor cycles during each 10 ms dispatch window. To optimize physical processor usage, a virtual processor will yield a physical processor if the virtual processor has no work to run or enters a wait-state such as waiting for an I/O operation to complete. The virtual processor yields the physical processor through a call to Phyp 135.

Figure 5:
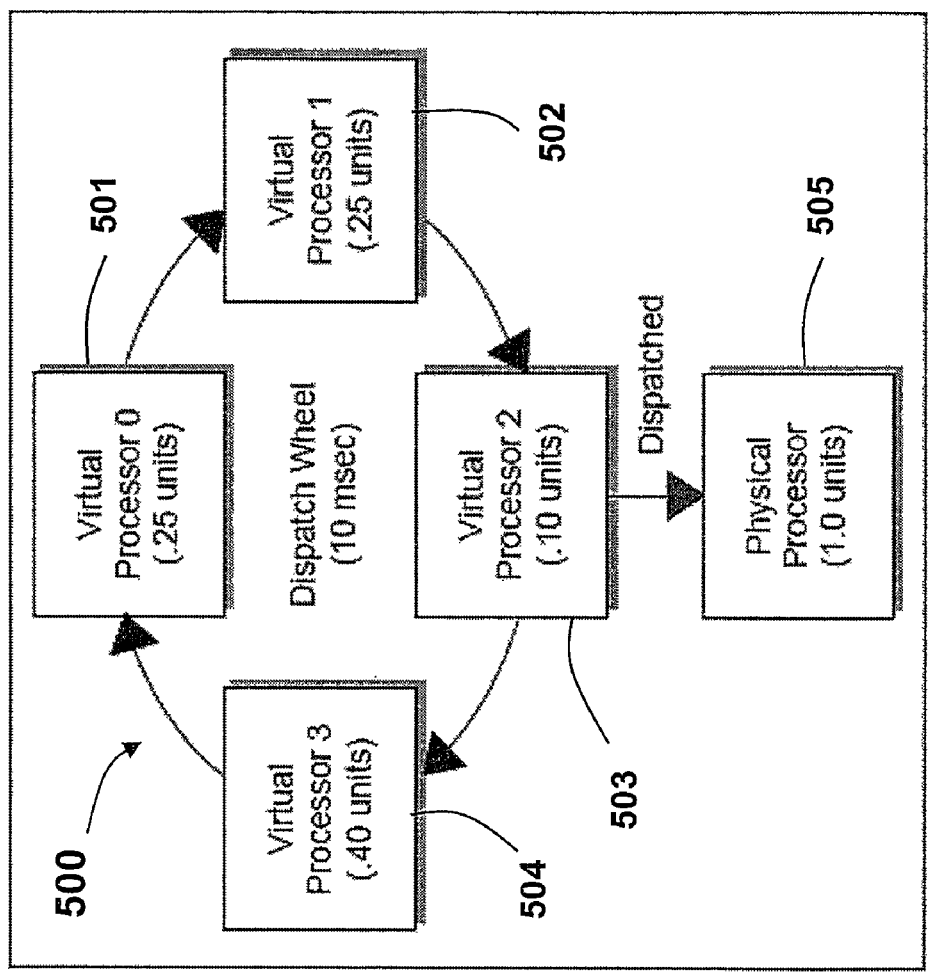
FIG. 5 is a block diagram illustrating the POWER Hypervisor dispatch wheel and the assignment of virtual processors to a physical processor, according to the described embodiment.

FIG. 5 is a block diagram of a POWER Hypervisor dispatch wheel, illustrating the assignment of virtual processors (in a single partition) to a physical processor (such as CPU1 102 of FIG. 1). Phyp dispatch wheel 500 comprises first virtual processor (0) 501, second virtual processor (1) 502, third virtual processor (2) 503, fourth virtual processor (3) 504, and physical processor 505. The Phyp 135 uses the architectural metaphor of a dispatch wheel with a fixed time-slice of 10 milliseconds (1/100 seconds) to guarantee that each virtual processor receives its share of the entitlement in a timely fashion. In particular, the entitled processing unit of each partition is distributed to one or more virtual processors, which will then be dispatched onto physical processors in a time-slice manner during every 10 ms cycle of the dispatch wheel. The time that each virtual processor gets dispatched depends on the number of virtual processors and the entitled processing capacity of the partition. When a partition is completely busy, the partition entitlement is evenly distributed among its online virtual processors. Phyp 135 manages a dispatch wheel for each physical processor in the shared pool. Thus, FIG. 5 illustrates the assignment of virtual processors to a single physical processor.

In Phyp dispatch wheel 500, entitled processing capacity has been assigned as follows: first virtual processor (0) 501 has been assigned entitled processing capacity of 0.25 units; second virtual processor (1) 502 also has 0.25 units; third virtual processor (2) 503 has 0.10 units; and fourth virtual processor (3) 504 has been assigned 0.40 units. Thus, the total partition requirement is 1.0 (sum of all virtual processor entitlements). Since the partition's required entitlement (1.0 unit) is satisfied by the available physical processor entitlement (also 1.0 unit), the partition will be started and the Phyp 135 will begin to dispatch the required virtual processors to each physical processor evenly.

For every subsequent time slice, the Phyp 135 does not guarantee that all virtual processors will be dispatched in the same order, nor does the Phyp 135 guarantee that the virtual processors in a given partition are dispatched together. However, the Phyp 135 does ensure that every partition gets its (the partition's) entitlement if needed. The dispatch wheel works the same way when simultaneous multithreading is enabled for a processor or group of processors. The two logical processors (hardware threads) are dispatched together whenever the Phyp 135 schedules the virtual processor to run. The amount of time that each virtual processor runs is split between the two logical processors.

Figure 9:
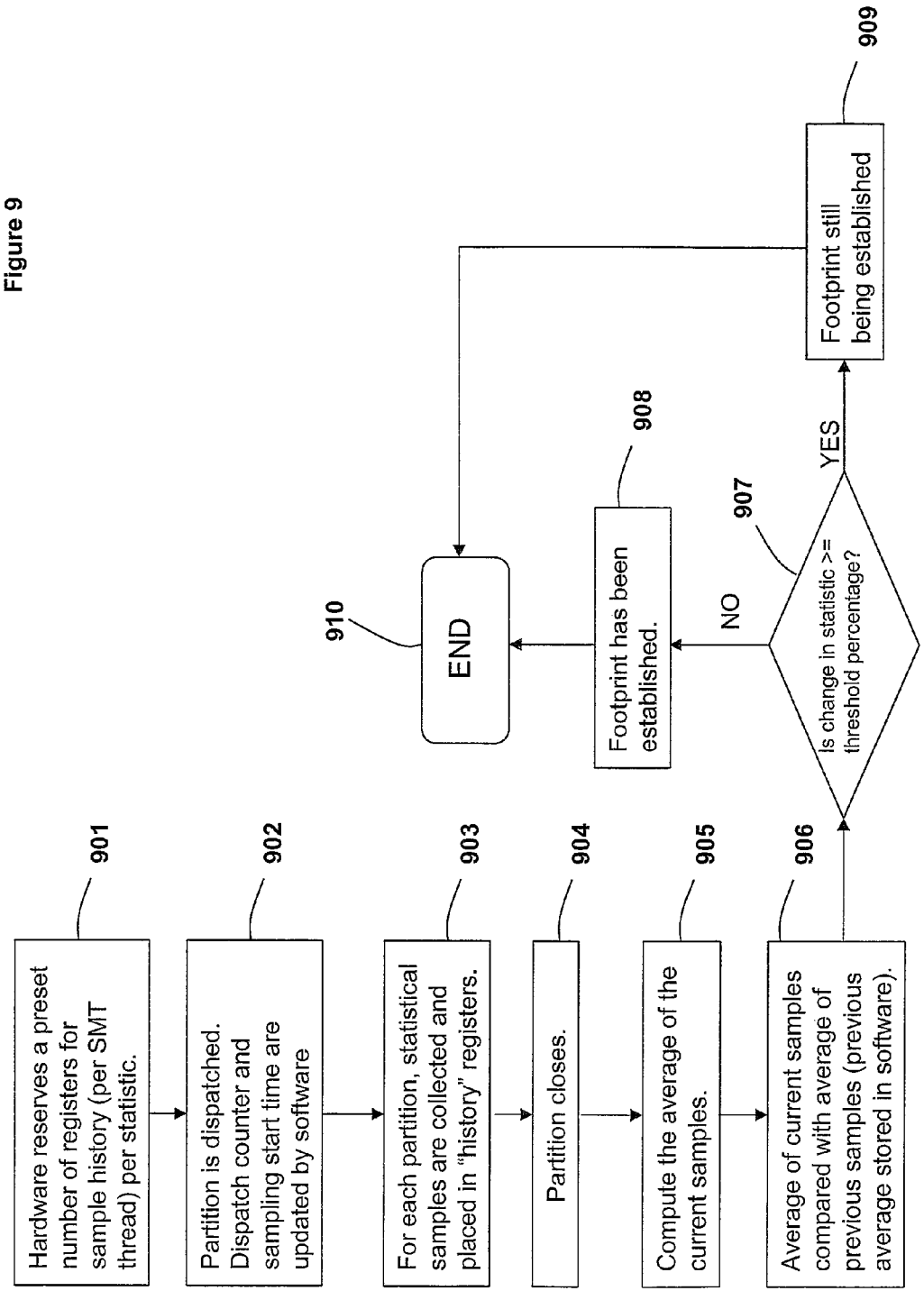
FIG. 9 is a flow chart illustrating the process of collecting and analyzing CPI partition statistics during system instantiation (i.e., the cold start method), according to one embodiment.

In order to enhance dispatch decisions and tuning recommendations, partition statistics collection & analysis (PSCA) utility 140 is utilized (as described in FIG. 9). PSCA utility 140 utilizes hardware support (in addition to firmware) in order to efficiently provide highly granular statistical data with minimal intrusion to the partition. In particular, PSCA utility 140 provides statistics which include (but are not limited to) the following: (1) instructions completed; (2) L2 cache misses; and (3) clocks/cycles per instruction (CPI). Further, PSCA utility 140 provides statistics in order to satisfy a number of functions, including: (1) determining the location of footprint establishment during the "cold start" period following system instantiation; (2) monitoring a CPI curve for movement of the CPI curve for a new "knee" location; and (3) monitoring and collecting of statistical samples to guide dispatch decisions and tuning recommendations (illustrated by FIG. 9).

The statistical collection and data monitoring process requires hardware support to make the collection/monitoring process fast/efficient, cheap/inexpensive and minimally intrusive. In addition, statistical collection requires monitoring for specified intervals, and the sampling frequency must be granular enough to provide an adequate number of samples for a partition's short run time within each dispatch window. Collecting the statistics should not impair the performance of the overall system and should not require vast system resources. The special purpose registers called Process Utilization and Resource Registers (PURR), of which PURR1 135 and PURR2 136 (illustrated in FIG. 1) are examples, satisfy the above requirements. The collected statistics may include: instructions completed; Level 2 (L2) cache misses; and clocks/cycles per instruction (CPI). Additionally, the nature of a workload may vary over time. Data that varies widely may have a low reliability factor. Therefore, PSCA utility 135 includes a pre-set reliability factor/threshold (which PSCA utility 135 maintains in a persistent manner) to aid in making decisions about the quality of the data. Data that exhibit large variations in CPI, for example, are classified as "variable".

By collecting partition statistics, performance conclusions may be drawn about the behavior of the workload running in a partition, both at start up and during execution. These statistics enable Phyp 135 to determine which partitions to schedule based on start up costs, for example. In addition, performance characteristics of a workload during execution (for example, processor affinity, memory accesses, etc) may be determined for tuning recommendations. As an example, if a partition is running (in a steady state or other process stage), an examination of CPI statistics may determine what the partition is doing (for example, loading the footprint or running a workload).

Figure 6:
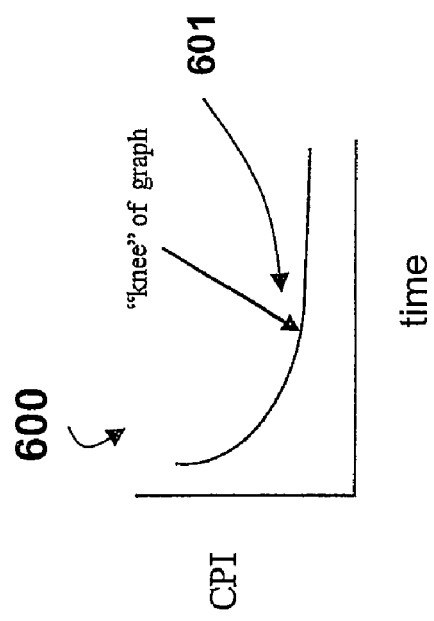
FIG. 6 is a cycles per instruction (CPI) waveform illustrating the onset of steady state marked by the "knee" of the graph.

FIG. 6 is a CPI waveform plotting CPI against time. The CPI waveform illustrates the onset of steady state marked by the "knee" of the graph. The CPI statistic may be used to determine the behavior of a partition. However, a partition's behavior and the workload currently ruing in that partition may change over time. Therefore, it is necessary to examine the CPI over several dispatches, i.e., building a history of CPI statistics. In fact, the CPI of a particular partition and workload combination varies as the partition is dispatched. CPI waveform 600 demonstrates that the CPI of a partition decreases over time as the footprint is established. The steady state portion of the graph represents the time during which the partition is doing meaningful work. PSCA utility 140 analyzes CPI statistics in order to determine the graph location of a key indicator of start up costs, referred to as the "knee" of the graph. A change in CPI statistics meeting a predetermined threshold indicates the knee location. The time elapsed prior to the knee 601 of the graph was spent establishing the footprint for the partition. Tracking the start up costs for a partition requires periodic sampling from the hardware as well as support from Phyp firmware (as described in FIG. 9).

Figure 7:
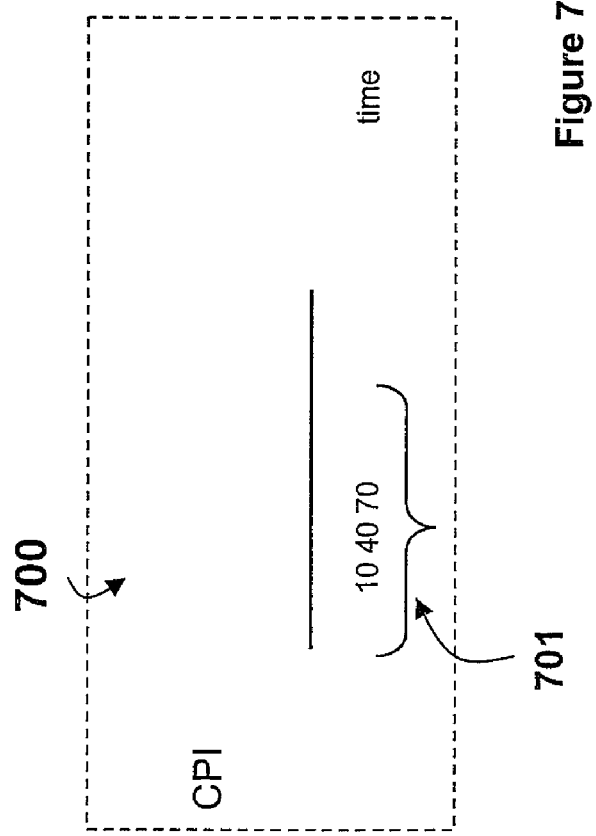
FIG. 7 shows the progression of the sampling start time (along the time scale of the CPI graph of FIG. 6) in subsequent dispatches of a partition for which a cold start algorithm is utilized, according to an illustrative embodiment of the present invention.

FIG. 7 shows the progression for CPI waveform 700 of the sampling start time (along the time scale of the CPI graph) in subsequent dispatches of a partition (arbitrarily referred to as partition A) for which a cold start algorithm is utilized, according to an illustrative embodiment. The point of monitoring the cold start algorithm is to determine how long the process of establishing a footprint takes. Fortunately, the cold start algorithm leads to a precise determination of instantiation. The cold start algorithm records CPI over several statistical samples, and the start time for collecting these samples is programmable. At each dispatch of partition A, the moment at which the firmware/utility begins sampling is incremented.

Sampling start time progression is indicated by sample three start times separated by preset interval (or sampling period) 701 in FIG. 7. As the start time progresses, a history, which describes the changing slope in the CPI curve, is being built. On the initial dispatch of partition A, sampling begins at time 10. When Partition A is again dispatched, sampling is started at time 40, an increment of 30 time units. When partition A is dispatched for the third time sampling begins at time 70. It is understood that the use of a sampling period of 30 units is solely for example and that other, different sized sampling periods may be utilized. Consequently, a change in CPI that is less than a threshold value (for example, 5%) indicates that the knee of the curve has been found. The time to start sampling is stored and is updated each time the partition is dispatched. Thus, the time to establish the footprint is precisely known.

Figure 8:
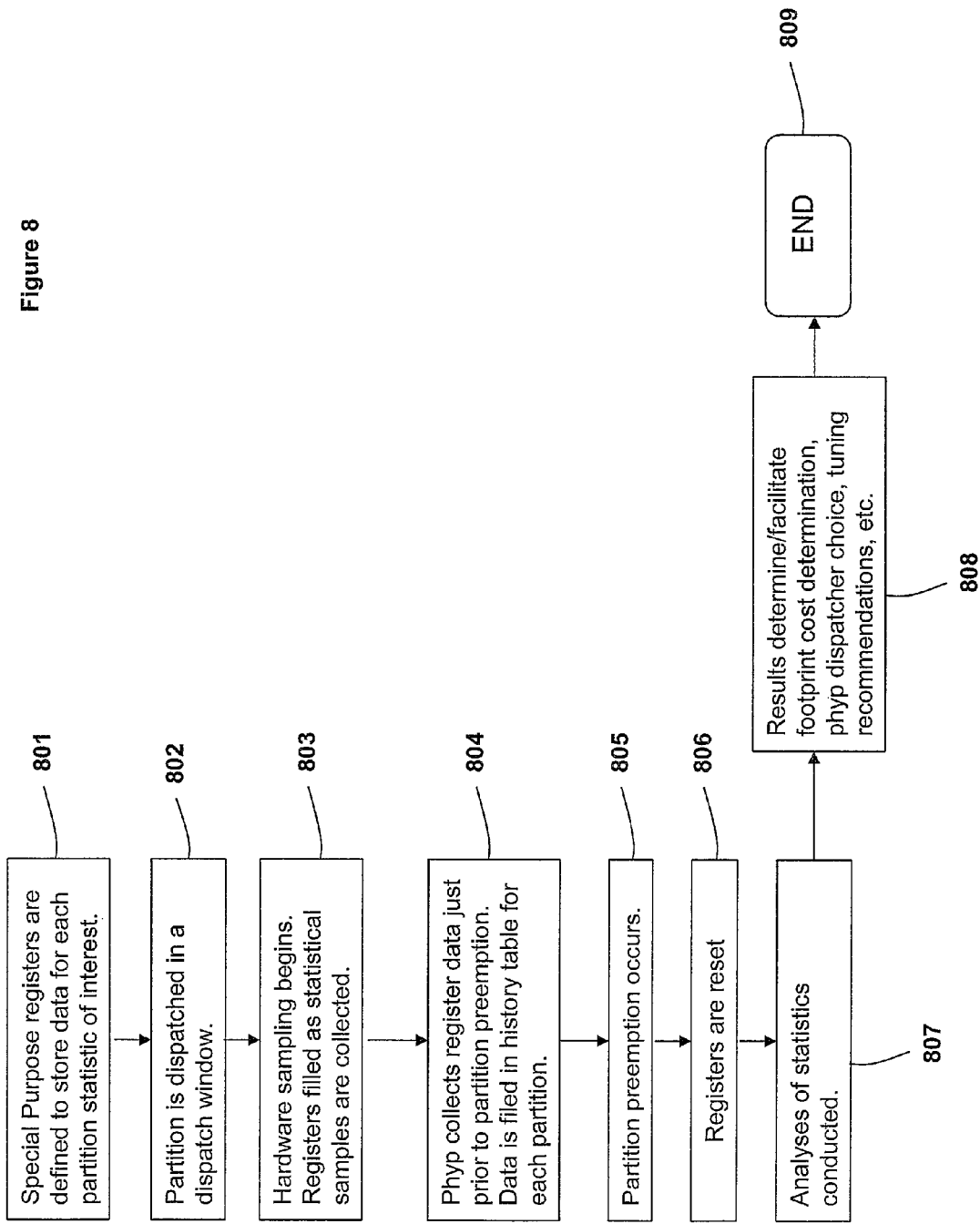
FIG. 8 is a flow chart illustrating the process by which the PSCA utility completes granular statistical sampling and analysis, according to one embodiment.

FIG. 8 illustrates the process by which PSCA utility 140 completes granular statistical sampling and analysis, according to one embodiment. The process begins at block 801, at which special purpose registers, e.g., PURR1 104 and PURR2 105 (illustrated in FIG. 1), are defined to store data for each partition statistic of interest. At block 802, a partition is dispatched in a dispatch window. The process continues at block 803, at which hardware sampling begins and PSCA utility 140 fills the special purpose registers with the statistical samples collected (during the hardware sampling) by PSCA utility 140. At block 804, based on a timing trigger, Phyp 135 collects register data just prior to partition preemption. Data is filed in a history table (stored within memory or storage) for each partition. Following the collection of register data and filing of the history table, partition preemption occurs, as shown at block 805, and the special purpose registers are reset, as shown at block 806.

As provided at block 807, the process of granular statistical sampling and analysis continues and PSCA utility 135 conducts analyses of the collected data to generate results. Results may then be utilized to determine/facilitate footprint cost determination, Phyp dispatcher choice, and tuning recommendations, as shown at block 808. In addition, a reliability threshold looks at the history of the statistics and the statistics are examined upon every rotation through the scheduling wheel to determine if any improvement/efficiency is gained by utilizing the history to make scheduling or tuning recommendations. This reliability threshold is similar to the statistical notion of a confidence level.

Data that varies widely will have a low reliability factor indicating that dispatching decisions or tuning recommendations should likely not be made using this data. In general, partitions exhibit a wide range of behavior. That is, some partitions may incur a consistent start-up cost, while other partitions display a variable start-up cost within a small range. Further, some partitions may display wildly varying start-up costs. It is necessary to employ a reliability threshold (described below) to make tuning recommendations or dispatching decisions. Thus, some partitions may not follow a smooth CPI curve. The partitions that follow a smooth curve may be considered "well-behaved" and are categorized accordingly. Those partitions that exhibit large variations in CPI are classified as "variable". A reliability threshold based on variability may be set and tuned by the system administrator.

This setting and tuning of the reliability threshold may be accomplished as follows. If the change in CPI between the current dispatch window and the previous dispatch window indicates a rising CPI (as an example), PSCA utility 140 sets a parameter value indicating that the data is not reliable for tuning recommendations. There are several statistical changes that will fail the reliability test, but an example is given for CPI as the focus for the footprint algorithm (see FIG. 9, described below). For partitions which do not meet the reliability threshold, scheduling efficiencies or performance tuning may not be recommended. For the partitions whose histories meet the reliability threshold, the footprint information may be used for efficient scheduling.

As the dispatcher of Phyp 135 employs PSCA utility 140 to make efficient scheduling decisions with regard to the partitions, the start up costs will decrease. The converse is also likely when a new partition is added into the set of system partitions. This new partition may significantly alter the start up costs for the existing partitions. The graphical effect this addition of a new partition will have on the other partitions is that the knee of the curves of the other partitions may move. In the cases where PSCA utility 140 facilitates more efficient scheduling, the (CPI) curve will move more to the left. In the cases where the footprints have been seriously disturbed, the curve will move to the right indicating additional start up costs.

The granular statistics that are being collected are per virtual CPU (VCPU) per partition. The collected statistics/data is under the control of the OS running on that VCPU. The jobs that are being scheduled in the partition are not under the control of Phyp 145. The OS maps processes to VCPU(s). Phyp 135 maps VCPU(s) to physical CPUs. Thus, dramatic changes in OS behavior are unlikely.

The statistical history of a partition may become invalid each time a partition is added or deleted from the system. This is because the time to establish a footprint for any given partition is dependent on the footprints of the other partitions in the system. A cold-restart period is required when the statistical histories of partitions become invalid.

FIG. 9 illustrates the process of collecting and analyzing CPI partition statistics during system instantiation (i.e., the cold start method), according to the described embodiment. The process begins at block 901, at which a preset number of special purpose registers are reserved to store sample history data (per SMT thread) for each partition statistic of interest. At block 902, a partition is dispatched in a dispatch window, and PCSA utility 135 updates a dispatch counter and the sampling start time. The process continues at block 903, at which hardware sampling begins in which the special purpose "history" registers are filled as the statistical samples are collected. The partition is subsequently preempted (or yields the processor resources), as shown at block 904. At block 905, PSCA utility 140 then computes the average of the current samples. Further, PSCA utility 140 compares, at block 906, the average of the current samples with average of previous samples (previous average stored). PSCA utility 140 then determines, at block 907, whether the change in the particular statistic being monitored is greater than or equal to a preset threshold percentage change. Considering the CPI statistic, PSCA utility 140 determines (at block 907) whether the change in CPI is, at least, a threshold value (of 5%, as an example). Different threshold values may be utilized in different implementations/embodiments.

If the change in CPI statistics is less than the threshold values (as determined by PSCA utility 140), then the footprint of the partition has been established, as indicated at block 908. Alternatively, if the change in CPI statistics is greater than or equal to the threshold values (as determined by PSCA utility 140), then the footprint of the partition has not yet been established, as indicated at block 909.

Figure 10:
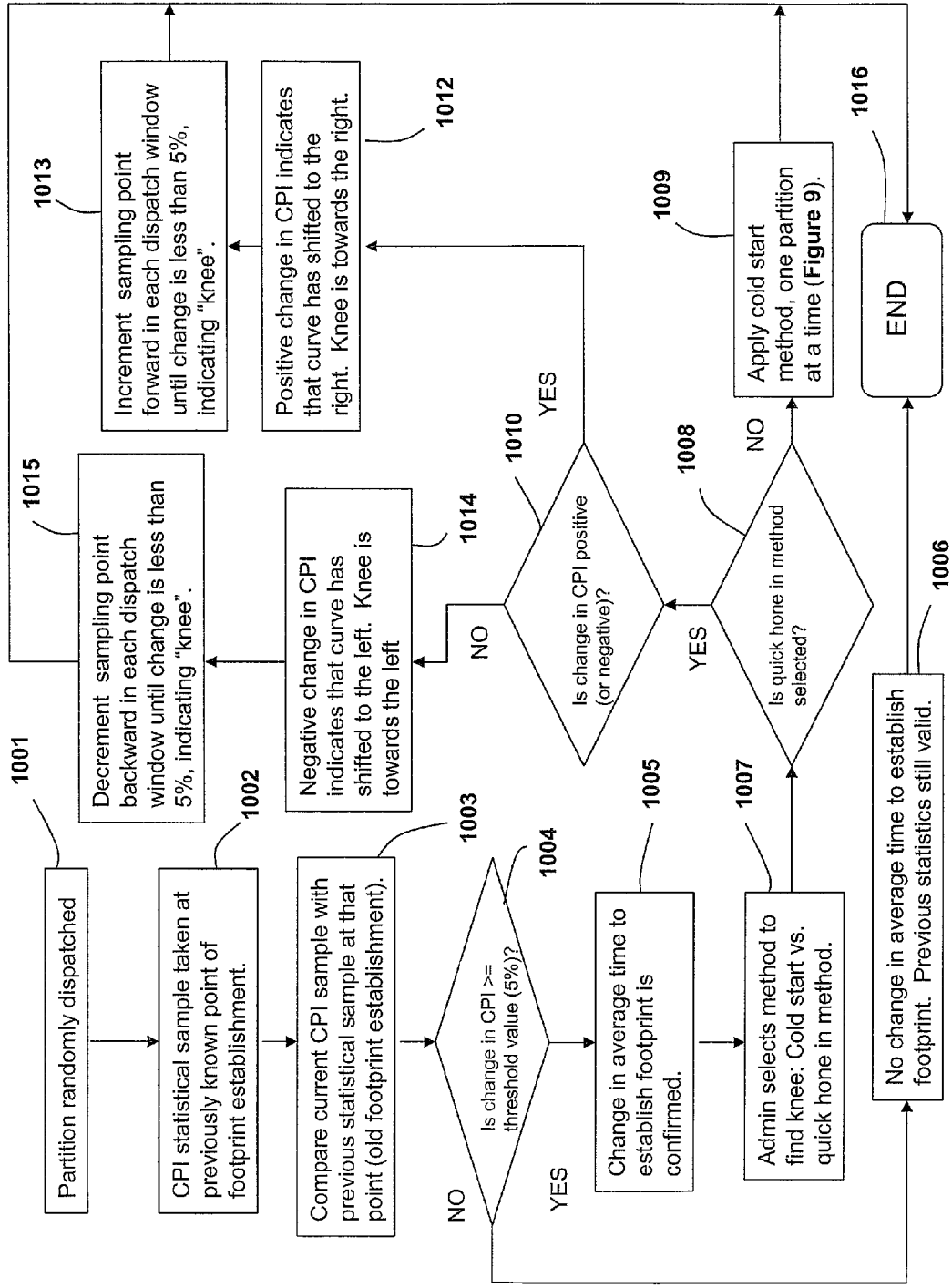
FIG. 10 is a flow chart illustrating the process of collecting and analyzing CPI partition statistics by the PSCA utility during CPI "knee" location, according to one embodiment.

FIG. 10 illustrates the process of collecting and analyzing CPI partition statistics by the PSCA utility during CPI "knee" determination, according to the described embodiments. The process begins at block 1001, at which a partition is randomly dispatched in a dispatch window. A CPI statistical sample is taken at the previously known point of footprint establishment, as shown at block 1002. At block 1003, the current CPI sample is compared with the previous statistical sample at that point (where footprint was previously established). PSCA utility 140 determines, at block 1004, whether the change in CPI statistic is at greater than or equal to the pre-established threshold (e.g., 5%). If PSCA utility 140 determines that the change in CPA statistics is less than the pre-established threshold, then there is no significant change in the average time to establish the partition's footprint and the previous statistics are still valid, as indicated at block 1006. Conversely, if PSCA utility 140 determines that the change in CPI statistics is greater than or equal to the pre-established threshold value, then the average time to establish the partition's footprint has changed, and the previously collected statistics are invalid, as indicated at block 1005.

The process continues at block 1007, at which an administrator selects a method to determine the knee location of the CPI curve from among a cold start method or a quick "hone in" method. At block 1008, PSCA utility 140 determines whether the quick hone in method (versus the cold start method) was selected to determine the time to establish the footprint of the partition. If the cold start method was selected as the means to determine the time to establish the footprint of the partition, then the cold start method (described above in FIG. 9) is carried out on each partition (one partition at a time), as indicated at block 1009.

If the quick hone in method was selected, then PSCA utility 140 also determines whether the change in CPI was positive, as indicated by block 1010. If the change in CPI is negative, then the CPI curve (and the knee location) has shifted to the left, as indicated by block 1014. Thus, in order to re-establish the knee location of the CPI curve, the statistical sampling period is decremented (in time) in each subsequent dispatch window until the computed change between current and previous samples is less than the threshold value, as shown at block 1015. For example, during an initial dispatch window, sampling time may take place at 30 ms (units of time). During the second dispatch window, sampling may occur at 10 ms. A computed change which is less than the threshold value indicates the re-establishment of the footprint.

If at block 1012, PSCA utility 140 determines that the change in CPI is positive, then the CPI curve (and the knee location) has shifted to the right, as shown by block 1012. In order to re-establish the knee location of the CPI curve, the statistical sampling point is incremented forward in each subsequent dispatch window, as shown at block 1013. This incrementing of the statistical sampling point continues until the computed change between current and previous samples is less than the threshold value indicating the re-establishment of the footprint.

In the flow charts (FIG. 8, FIG. 9, FIG. 10) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A data processing system comprising:
   one or more system resources that are accessible to processes executing within multiple logical partitions, wherein the one or more system resources comprise at least one processor;
   a partitioning firmware that enables sharing of the one or more system resources across multiple logical partitions, each logical partition having a separate instance of an operating system, wherein said partitioning firmware further allocates specific entitlements of system resources to processes executing within each of the multiple logical partitions; and
   a processor executable utility that executes on a processor of the data processing system to cause the processor to perform the functions of:
      sampling one or more statistical data associated with performance characteristics of the logical partitions;
      analyzing said statistical data against pre-established scheduling criteria by:
         evaluating a measured change in cycles per instruction (CPI) over time;
         comparing said measured change to a pre-set threshold value of change; and
         calculating start up costs for the partition based on a time required for the measured change of the CPI to transition to a value equal to or below the pre-set threshold value;
         wherein a first measured change indicates the partition is still establishing a footprint and a second measure change indicates the partition is operating at steady state and completing actual work; and
         periodically sampling the CPI of the partition to determine whether a next measured change in the CPI indicates a re-establishing of the footprint of the partition;
      dynamically determining a most efficient scheduling of the multiple logical partitions and an allocation of the system resources to the multiple logical partitions based on a result of said analyzing of the statistical data; and
      making dispatch decisions and tuning (a) the scheduling of the multiple logical partitions and (b) the allocation of the system resources to the multiple logical partitions utilizing a result of the determining of a most efficient scheduling based on analyzing the statistical data.

2. The data processing system of claim 1, further comprising:
   one or more hardware registers reserved to collect the statistical data for a current partition within a dispatch window; and
   wherein the utility further causes the processor to perform the functions of:
      collecting the statistical data related to processes of the current logical partition within the dispatch window; and
      storing the current statistical data within the one or more hardware registers.

3. The data processing system of claim 2, wherein the statistical data comprises one or more of: (1) instructions completed; (2) lower level cache misses; and (3) cycles per instruction (CPI), wherein when the statistical data being sampled include CPI:

said collecting the statistical data further comprises sampling the CPI of the partition over a period of multiple dispatch windows; and said analyzing the statistical data further comprises:
calculating change in a current value of the CPI relative to a previous value of the CPI; and
evaluating a time for an onset of steady state of the CPI based on said change;

sampling a current CPI at a previously determined time at which a footprint for the partition was established;

determining a change in CPI by comparing the current CPI with a previous CPI at the previously determined time at which the footprint was established;

tagging the previous CPI as a valid indication of a time to establish the footprint when the amount of change in the current CPI is less than a pre-established change threshold; and tagging the previously collected statistics as invalid and updating stored parameters related to the CPI and time to establish the footprint when the amount of change in the current CPI statistics is greater than the pre-established change threshold, which indicates a change in an average time to establish the footprint of the corresponding partition.

4. The data processing system of claim 1, wherein the utility further causes the processor to perform the functions of:

establishing a first interval of time at which to sample the CPI;

automatically conducting the sampling of the CPI at the expiration of each interval of time;

storing a start time at which to begin sampling the CPI of the partition; and at each subsequent dispatch window in which the partition processes work, updating the start time to begin sampling the CPI.

5. The data processing system of claim 1, wherein the utility further causes the processor to perform the functions of:

defining one or more hardware registers to store the statistical data for one or more partition statistic of interest;
dispatching a partition within a dispatch window;
performing hardware sampling of the one or more partition statistic of interest to collect statistical samples;
in response to detecting partition preemption:
automatically storing, within a history table for the current partition, the statistical data collected within the one or more hardware registers; and
resetting the one or more registers to receive statistical data from a next scheduled partition following the partition preemption.

6. The data processing system of claim 1, wherein the utility further causes the processor to perform the functions of:

receiving a timed interrupt, wherein said timed interrupt is independent of partition activity and triggers a preemption of a current partition for processing of a subsequently scheduled partition; and in response to receiving the timed interrupt:
computing an average of current samples of statistical data;
comparing the average of the current samples with a previous average of previous samples of statistical data collected during a previous dispatch window to calculate a percentage change;
determining when the percentage change in a particular statistic is less than a preset threshold percentage change;
in response to the percentage change being less than the threshold percentage change:
tagging said data as indicating that a footprint of the partition has been established; and
storing a time associated with the establishment of the footprint; and
in response to the percentage change not being less than the threshold percentage change, iterating through the process for collecting statistical data and determining a percentage change until the footprint of the partition is established.

7. The data processing system of claim 1, wherein the utility further causes the processor to perform the functions of:

compiling statistical histories of the multiple logical partitions;
accessing the statistical histories when performing the analyzing of statistical data; and
in response to the statistical histories of the multiple logical partitions becoming invalid, initiating a cold restart period, which causes a re-evaluation of times to establish a footprint for each partition, wherein said histories become invalid in response to specific activity, including adding and removing of a partition from the data processing system.

8. The data processing system of claim 1, wherein the utility further causes the processor to perform the functions of:

receiving an input which indicates initiation of a method from among a cold start method and a quick hone in method to determine a time to establish the footprint of the current partition;
in response to the input indicating initiation of the cold start method, initiating the cold start method, wherein the cold start method is performed on each partition, one at a time, to determine the time to establish the footprint of each partition;
in response to the quick hone in method being received as the input:
determining whether a change in a cycles per instruction (CPI) of a current partition is positive;
in response to the change in CPI not being positive, indicating a decrease in the time to establish the footprint, iteratively decrementing a statistical sampling period for each subsequent sampling of the CPI of the partition until a computed change between a current CPI and a previous CPI is less than a threshold value, such that the footprint is re-established; and
in response to the change in CPI being positive, indicating an increase in the time to establish the footprint, iteratively increasing the statistical sampling period for each subsequent dispatch window until the computed change between the current CPI and the previous CPI is less than the threshold value, such that the footprint is re-established.

9. The data processing system of claim 1, wherein:
the one or more system resources includes said firmware;
said hardware register is located on a processor die of the at least one processor;
said evaluating a measured change in the CPI over time comprises:

a partition statistics collection & analysis (PSCA) utility, which comprises executable code that utilizes hardware and firmware support to efficiently provide highly granular statistical data with minimal intrusion to the partition;

said partitioning firmware provides: (1) micro-partitioning that enables multiple partitions to share a single physical processor as shared processor partitions and (2) virtualization, such that a pooling of system resources enables (a) access to said system resources across multiple logical partitions; (b) dynamic resource movement across multiple environments, wherein said system resources are moved between the multiple logical partitions as workloads are moved between the multiple logical partitions; and (c) a POWER Hypervisor (Phyp) dispatcher for virtual processor accounting which allocates virtual processors via a POWER Hypervisor dispatch wheel, with a fixed time-slice to guarantee that each virtual processor receives its share of processor entitlement in a timely manner; and said determining a most efficient scheduling comprises:
analyzing, via a reliability threshold, the history table of the statistical data at each rotation through a scheduling wheel to determine if an improvement in efficiency is gained by utilizing the statistical data within a history table to make scheduling and tuning recommendations to the firmware; and
in response to a change in CPI between a current dispatch window and a previous dispatch window of the partition indicating a rising CPI, setting the reliability parameter to indicate that the data is not reliable for tuning recommendations, wherein data with a low reliability factor are not utilized in making dispatching decisions and tuning recommendations.

10. In a data processing system having system resources, including a processor and one or more operating systems, which system resources are shared among multiple logical partitions, a method comprising:
sampling one or more statistical data associated with performance characteristics of the logical partitions;
analyzing said statistical data against pre-established scheduling criteria, wherein said analyzing comprises:
determining a length of time for a footprint of a partition to become established during a cold start;
generating tuning recommendations for improving partition dispatch within the data processing system based on the length of time to establish the footprint of the partition;
determining a start up cost for each logical partition that may be dispatched within a dispatch window; and
evaluating performance characteristics of a workload during execution to determine tuning recommendations;
dynamically determining a most efficient scheduling of the multiple logical partitions and allocation of the system resources to the multiple logical partitions based on a result of said analyzing of the statistical data; and
making dispatch decisions and tuning the scheduling of the multiple logical partitions and the allocation of the system resources to the multiple logical partitions utilizing a result of the determining of a most efficient scheduling based on analyzing the statistical data.

11. The method of claim 10, further comprising:
collecting the statistical data related to processes of a current logical partition within a dispatch window;
storing the current statistical data within one or more hardware registers;
receiving a timed interrupt, wherein said timed interrupt is independent of partition activity and triggers a preemption of a current partition for processing of a subsequently scheduled partition;
in response to the timed interrupt being received:
computing an average of current samples of statistical data;
comparing the average of the current samples with a previous average of previous samples of statistical data collected during a previous dispatch window to calculate a percentage change;
determining when the percentage change in a particular statistic is less than a preset threshold percentage change;
in response to the percentage change being less than the threshold percentage change:
tagging said data as indicating that a footprint of the partition has been established; and
storing a time associated with the establishment of the footprint; and
in response to the percentage change being not less than the threshold percentage change, iterating through the process for collecting statistical data and determining a percentage change until the footprint of the partition is established;
automatically storing, within a history table for the current partition, the statistical data collected within the one or more hardware registers;
resetting the one or more registers to receive statistical data from a next scheduled partition following the partition preemption; and
accessing the history table of the multiple partitions when performing the analyzing of statistical data.

12. The method of claim 10, wherein the statistical data comprises one or more of: (1) instructions completed; (2) lower level cache misses; and (3) cycles per instruction (CPI), wherein when the statistical data being sampled include CPI, the method comprises:
automatically sampling the CPI of the partition over a first interval within a dispatch window;
calculating change in a current value of the CPI relative to a previous value of the CPI;
evaluating the change in the CPI over time;
comparing said change to a pre-set threshold value of change;
evaluating a time for an onset of steady state of the CPI based on said change;
calculating start up costs for the partition based on a time required for the change of the CPI to transition to a value equal to or below the pre-set threshold value;
wherein a first calculated change indicates the partition is still establishing a footprint and a second calculated change indicates the partition is operating at steady state and completing actual work;
periodically sampling the CPI of the partition to determine whether a next calculated change in the CPI indicates a re-establishing of the footprint of the partition;
storing a start time at which to begin sampling the CPI of the partition; and
at each subsequent dispatch window in which the partition processes work, updating the start time to begin sampling the CPI.

13. The method of claim 10, further comprising:
sampling a current cycles per instruction (CPI) at a previously determined time at which a footprint for the partition was established;

determining a change in CPI by comparing the current CPI with a previous CPI at the previously determined time at which the footprint was established;

tagging the previous CPI as a valid indication of a time to establish the footprint when the amount of change in the current CPI is less than a pre-established change threshold; and tagging the previously collected statistics as invalid and updating stored parameters related to the CPI and time to establish the footprint when the amount of change in the current CPI statistics is greater than the pre-established change threshold, which indicates a change in an average time to establish the footprint of the corresponding partition.

14. The method of claim 10, further comprising:

receiving an input which indicates initiation of a method from among a cold start method and a quick "hone in" method to determine a time to establish the footprint of the current partition;

in response to the input indicating initiation of the cold start method, initiating the cold start method, wherein the cold start method is performed on each partition, one at a time, to determine the time to establish the footprint of each partition;

in response to the quick hone in method being received as the input:

determining whether a change in a CPI of a current partition is positive;

in response to the change in CPI not being positive, indicating a decrease in the time to establish the footprint, iteratively decrementing a statistical sampling period for each subsequent sampling of the CPI of the partition until a computed change between a current CPI and a previous CPI is less than a threshold value, such that the footprint is re-established; and in response to the change in CPI being positive, which indicates an increase in the time to establish the footprint, iteratively increasing the statistical sampling period for each subsequent dispatch window until the computed change between the current CPI and the previous CPI is less than the threshold value, such that the footprint is re-established; and in response to history tables of the multiple logical partitions becoming invalid, automatically initiating a cold restart period, which causes a re-evaluation of times to establish a footprint for each partition, wherein said histories become invalid in response to specific activity, including adding and removing of a partition from the data processing system.

15. In a data processing system having system resources, including a processor and one or more operating systems, which system resources are shared among multiple logical partitions, a method comprising:

sampling one or more statistical data associated with performance characteristics of the logical partitions;

analyzing said statistical data against pre-established scheduling criteria;

dynamically determining a most efficient scheduling of the multiple logical partitions and allocation of the system resources to the multiple logical partitions based on a result of said analyzing of the statistical data;

making dispatch decisions and tuning the scheduling of the multiple logical partitions and the allocation of the system resources to the multiple logical partitions utilizing a result of the determination of a most efficient scheduling based on analyzing the statistical data;

monitoring, for pre-specified intervals, a cycles per instruction (CPI) change over time;

wherein the pre-specified interval is a first sampling frequency, which frequency is sufficiently granular to provide an adequate number of samples for a partition's run time within each dispatch window;

comparing a reliability factor of the data against a pre-set reliability factor threshold;

determining a quality of the statistical data collected based on the comparing of the reliability factor, wherein statistical data exhibiting large variations in CPI are classified as variable and not reliable; and in response to a change in CPI between a current dispatch window and a previous dispatch window of the partition indicates a rising CPI, setting the reliability parameter to indicate that the data is not reliable for tuning recommendations, wherein data with a low reliability factor are not utilized in making dispatching decisions and tuning recommendations.

16. A computer program product comprising a computer readable storage medium and program instruction on the computer readable storage medium that when executed provides the functions recited by claim 10.

17. A computer program product comprising:

a computer readable storage medium; and program code on the computer readable storage medium that when executed within a data processing system that supports logical partitioning provides the functions of:

sampling one or more statistical data associated with the logical partitions;

analyzing said statistical data against pre-established scheduling criteria;

dynamically determining a most efficient scheduling of the multiple logical partitions and allocation of the system resources to the multiple logical partitions based on a result of said analyzing of the statistical data;

collecting the statistical data related to processes of the current logical partition within a dispatch window;

storing the current statistical data within one or more hardware registers;

receiving a timed interrupt, wherein said timed interrupt is independent of partition activity and triggers a preemption of a current partition for processing of a subsequently scheduled partition;

in response to receiving the timed interrupt:

computing an average of current samples of statistical data;

comparing the average of the current samples with a previous average of previous samples of statistical data collected during a previous dispatch window to calculate a percentage change;

determining when the percentage change in a particular statistic is less than a preset threshold percentage change;

in response to the percentage change being less than the threshold percentage change:

tagging said data as indicating that a footprint of the partition has been established; and storing a time associated with the establishment of the footprint; and in response to the percentage change not being less than the threshold percentage change, iterating through the process for collecting statistical data and determining a percentage change until the footprint of the partition is established;

automatically storing, within a history table for the current partition, the statistical data collected within the one or more hardware registers;

resetting the one or more registers to receive statistical data from a next scheduled partition following the partition preemption;

accessing the history table of the multiple partitions when performing the analyzing of statistical data; and in response to the statistical data comprising one or more of: (1) instructions completed; (2) lower level cache misses; and (3) cycles per instruction (CPI), wherein when the statistical data being sampled include CPI, the program instructions include instructions for:

automatically sampling the CPI of the partition over a first interval within a dispatch window;

calculating change in a current value of the CPI relative to a previous value of the CPI;

evaluating the change in the CPI over time;

comparing said change to a pre-set threshold value of change;

evaluating a time for an onset of steady state of the CPI based on said change;

calculating start up costs for the partition based on a time required for the change of the CPI to transition to a value equal to or below the pre-set threshold value;

wherein a first calculated change indicates the partition is still establishing a footprint and a second calculated change indicates the partition is operating at steady state and completing actual work;

periodically sampling the CPI of the partition to determine whether a next calculated change in the CPI indicates a re-establishing of the footprint of the partition;

storing a start time at which to begin sampling the CPI of the partition; and at each subsequent dispatch window in which the partition processes work, updating the start time to begin sampling the CPI.

18. The computer program product of claim 17, further comprising program instructions for:

receiving an input which indicates initiation of a method from among a cold start method and a quick hone in method to determine a time to establish the footprint of the current partition;

in response to the input indicating initiation of the cold start method, initiating the cold start method, wherein the cold start method is performed on each partition, one at a time, to determine the time to establish the footprint of each partition;

in response to the quick hone in method being received as the input:

determining whether a change in a CPI of a current partition is positive;

in response to the change in CPI not being positive, indicating a decrease in the time to establish the footprint, iteratively decrementing a statistical sampling period for each subsequent sampling of the CPI of the partition until a computed change between a current CPI and a previous CPI is less than a threshold value, such that the footprint is re-established; and in response to the change in CPI being positive, indicating an increase in the time to establish the footprint, iteratively increasing the statistical sampling period for each subsequent dispatch window until the computed change between the current CPI and the previous CPI is less than the threshold value, such that the footprint is re-established; and in response to history tables of the multiple logical partitions becoming invalid, automatically initiating a cold restart period, which causes a re-evaluation of times to establish a footprint for each partition, wherein said histories become invalid in response to specific activity, including adding and removing of a partition from the data processing system.

* * * * *